United States Patent [19]

Sjoblom

[11] 4,199,164
[45] Apr. 22, 1980

[54] NESTABLE ROLLER PALLET

[76] Inventor: Ake E. Sjoblom, Landstormsvagen 8A, 702 27 Orebro, Sweden

[21] Appl. No.: 933,480

[22] Filed: Aug. 14, 1978

Related U.S. Application Data

[63] Continuation-in-part of Ser. No. 833,476, Sep. 15, 1977, abandoned.

[30] Foreign Application Priority Data

Sep. 23, 1976 [SE] Sweden .................. 7610063

[51] Int. Cl.² .............................................. B62B 3/02
[52] U.S. Cl. ............................. 280/33.99 H; 206/517; 220/255
[58] Field of Search ................. 280/33.99 H, 33.99 R, 280/33.99 A, 33.99 F; 220/255, 380; 206/517

[56] References Cited

U.S. PATENT DOCUMENTS

| | | | |
|---|---|---|---|
| 3,810,648 | 5/1974 | Hallenius | 280/33.99 R |
| 3,920,258 | 11/1975 | Lundstrom et al. | 280/33.99 H |
| 3,977,689 | 8/1976 | Rosa | 280/33.99 H |
| 3,981,510 | 9/1976 | Gustafsson | 280/33.99 H |

*Primary Examiner*—David M. Mitchell
*Attorney, Agent, or Firm*—James C. Wray

[57] ABSTRACT

A nestable load pallet or roller pallet comprising at least two opposed pallet side frames wherein said opposed pallet sides are pivotably connected to a horizontal connection along one of their vertical side edges, and a horizontal pallet deck is pivotably mounted to said horizontal connection between said pallet side frames. The pallet deck and pallet side frames are automatically and positively forced outwardly and inwardly by manual upward and downward movement of the pallet deck by means of a spiral guide and guide follower. The pallet deck can be locked in the vertical position while the side frames are in a diverged position whereby the load pallet can be nested with other load pallets.

14 Claims, 7 Drawing Figures

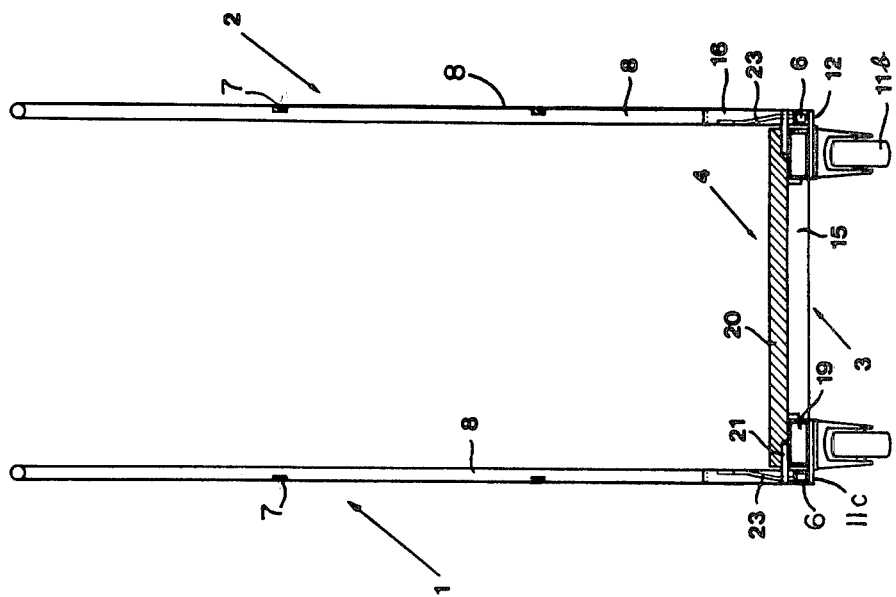
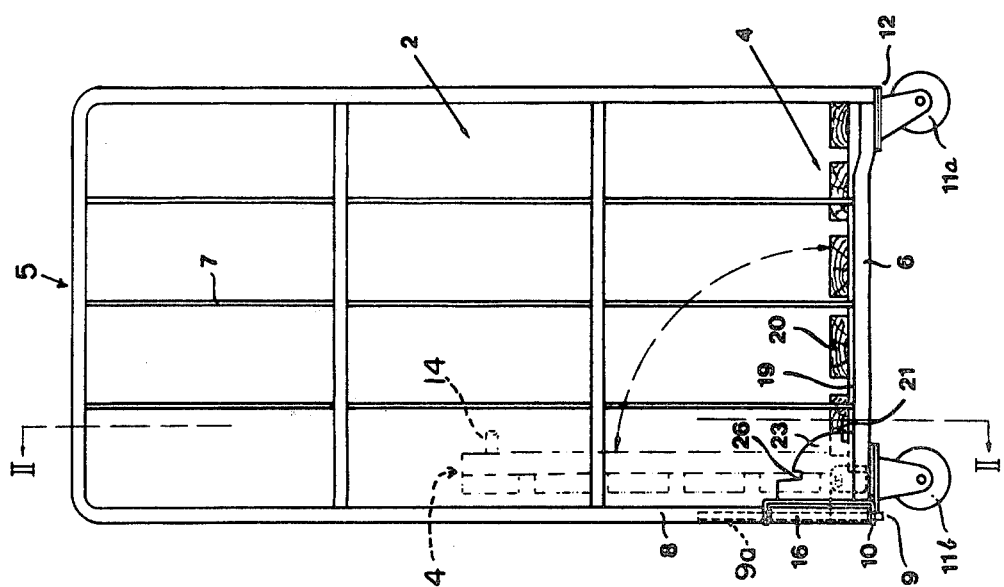

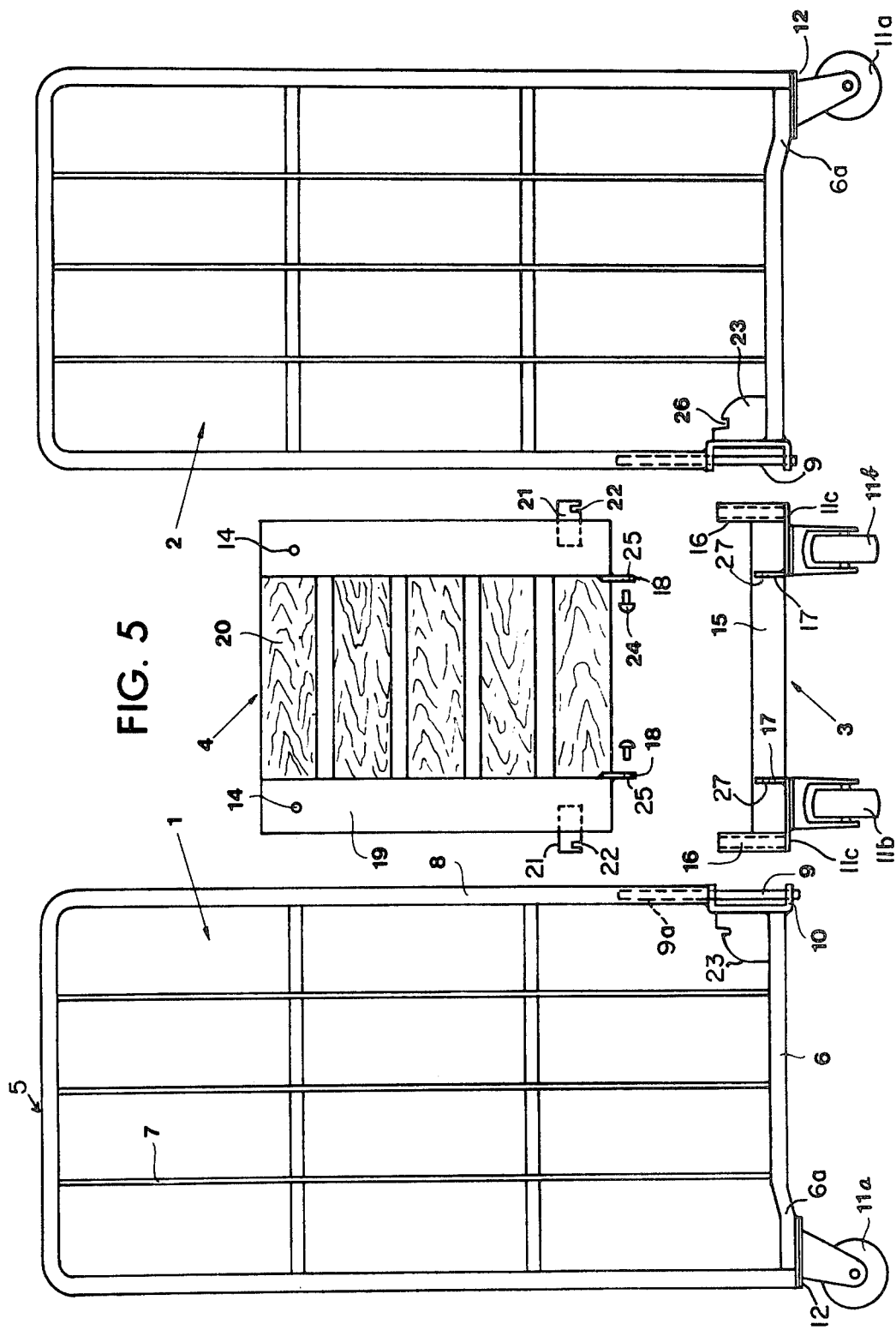

NESTABLE ROLLER PALLET

REFERENCE TO PRIOR APPLICATION

This application is a continuation-in-part of application Ser. No. 833,476 filed Sept. 15, 1977 and now abandoned.

BACKGROUND OF THE INVENTION

The present invention relates to nestable load pallets or roller pallets having decks and vertical frames. Modern material handling makes great demands on load pallets. In order to simplify the material handling and facilitate the work of the operating personnel, the load pallet should be made ready easily for loading and transportation; should take as little space as possible; and several of the pallets should be easily convertible into nestable states. The horizontal pallet deck should be simple and easy to raise to its vertical or folded up position, and to move the vertical side frames to a folded out position from each other to facilitate nesting.

Load pallets are known wherein the pallet deck can be folded up or pivoted upwardly to a substantially vertical position and in which two opposed vertical side frames can be folded out or pivoted outwardly so that several load pallets can be partly nested into each other. Examples of load pallets of this type are shown in U.S. Pat. Nos. 3,810,648; 9,920,258; 3,977,689 and 3,981,510. These prior art load pallets have a disadvantage in that the vertical side frames must be folded out manually at the same time the pallet deck is manually folded up, and this action usually requires the use of two men. In an effort to solve this problem, it has been suggested that the pallet deck be provided with cam means which can actuate or move the vertical side frames outwardly when the pallet deck is folded up, whereby the vertical side frames are folded out at the same time as the pallet deck is folded up. The vertical side frames can be formed with a stop means so as to prevent the vertical side frames from folding outwardly to a greater extent than necessary. When preparing the load pallet for loading and transport, the vertical side frames in this type of pallet must be manually pulled together at the same time as the pallet deck is folded down, and this action also usually requires the use of two men.

An additional disadvantage of known prior art load pallets is that the pallet deck must be secured in its folded up vertical position by the use of separate locking means so that the pallet deck is prevented from folding down or falling at undesirable or unanticipated times which can cause injury to operators. This locking means involves further work on the part of the operators.

Some of the known prior art load pallets are also constructed with the vertical side frames connected at one of their vertical edges to an intermediate rear vertical wall or frame. However, such load pallets having at least three sides are not well suited for handling larger items which can extend beyond both ends of the vertical side frames.

SUMMARY OF THE INVENTION

Accordingly, an object of this invention is to provide an improved load pallet or roller pallet which when being transported or stored can be nested into other load pallets whereby a minimum of floor space is occupied by the nested load pallets.

Another object of the invention is to provide a load pallet or roller pallet having vertical side frames and horizontal pallet deck which is highly versatile in use, can be used for many different purposes, and can be completely open beyond the ends of the vertical side frames.

A further object of the present invention is to provide a load pallet or roller pallet in which outward movement of the vertical side frames from their operating position when the pallet deck is being folded up, and inward movement of the vertical side frames to their operating position when the pallet deck is being folded down, occurs automatically with only manual movement of the pallet deck.

Another object of the invention is to provide a load pallet or roller pallet with a pallet deck which by the simple upward manual movement of the pallet deck, and without the need of any separate locking means can be locked into its folded up position.

Still another object of this invention is to provide a load pallet or roller pallet which can be used in both an operative position and a nestable position having only two opposed vertical side frames, similarly, the load pallet can comprise one or more pallet decks, and also alternatively comprise front and rear frames, and with or without a top cover or lid.

Briefly, the invention comprises a nestable load pallet or roller pallet comprising two opposed vertical side frames pivotably connected to lower horizontal connecting means, one or more horizontal pallet decks pivotably connected to the connecting means. The pallet deck, side frames, and connecting means are provided with guide means, whereby when the pallet deck is manually moved from its horizontal operating position upwardly to a vertical locked position, the side frames are automatically pivoted outwardly to a nestable position from their opposed operating position so that the load pallet can be nested with other pallet decks. Similarly, when the pallet deck is manually pivoted downwardly from its vertical locked position to a horizontal operating position, the side frames are automatically pivoted from their outward nestable position to their opposed operating position. Further advantages, features and additional objectives of the present invention will be evident to those skilled in the art from the following detailed description, wherein reference is made to the accompanying drawings:

BRIEF DESCRIPTION OF THE DRAWINGS

FIG. 1 is a side view of a nestable load pallet in accordance with the present invention showing the pallet deck in operating horizontal position and also in its vertical, folded-up, locked position, in phantom.

FIG. 2 is a view taken along line II—II of FIG. 1, partly in section;

FIG. 5 is an exploded view showing the four component parts of the load pallet wherein the pallet deck is shown in a bottom view and the lower connecting means is shown in a front end view;

DETAILED DESCRIPTION OF THE INVENTION

Figure 3:
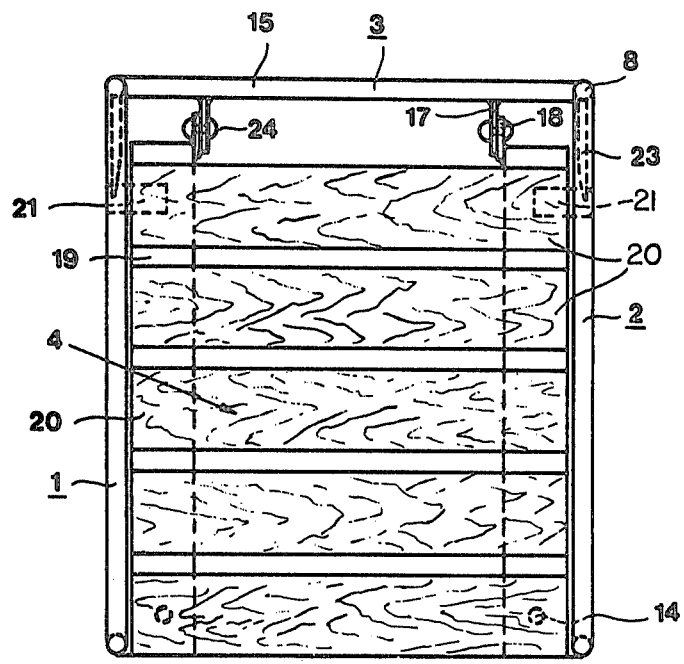
FIG. 3 is a top view of the load pallet shown in FIGS. 1 and 2 showing the pallet load position, and wherein the vertical side frames are folded in to their opposed operating position and the pallet deck is folded down to its horizontal operating position.

FIGS. 1-7 depict an embodiment of the load pallet or roller pallet of this invention which comprises vertical opposed side frames generally denoted by numerals 1 and 2, lower connecting means denoted generally by the numeral 3, and pallet deck means generally denoted by the numeral 4.

Side frames 1 and 2 each comprise inverted U-shaped bar member 5, lower horizontal bar member 6, conventional internal lattice structural members 7, rear end bar member 8 of U-shaped bar member 5, hinge pin 9 and hinge pin recess 9a in bar member 8, hinge ring 10, rotatable caster roller 11a mounted on support plate 12 provided with hole 13, and guide plate 23. Lower connecting means 3 comprises horizontal bar member 15, tubular hinge members 16 at each end of member 15, vertical eyelet members 17 containing eyelet and caster rollers 11b, preferably fixedly mounted on a plate 11C secured to bar member 15.

Pallet deck 4 comprises two parallel longitudinal bar members 19 having cross members or boards 20 secured thereto, vertical eyelet members 18 containing eyelet 25 at the inner rear end of each member 19, guide follower means 21 planarly disposed on the outer rearward edge of each member 19 near the eyelet members 18, and vertical pins 14 disposed on the bottom of members 19 near the front ends thereof.

Each of the side frames 1 and 2 are supported vertically and and pivotably connected to lower connecting means 3 by means of hinge pin 9 and hinge ring 10. These are installed by retracting hinge pin 9 into hinge recess 9a, placing tubular hinge member 16 into hinge ring 10, and lowering hinge pin 9 into the hinge member 16. Hinge ring 10 comprises a U-shaped member having branches 10a and 10b and a web portion 10c, with branches 10a and 10b containing holes for the passage of hinge pin 9.

The bar member 15 is preferably solid and hinge members 16 are rigidly connected thereto. Both members are of solid heavy construction and of sufficient dimensions, whereby it is possible to dispose the bar member 15 relatively low and at the same level as the upper side of the pallet deck in the horizontal position.

Because the side frames 1 and 2 are connected to the bar member 15 at both ends, and both ends of the pallet deck are open, it is possible to load and handle items on the pallet deck which are longer than the side frames. However, if desired, the load pallet can be provided with a vertical end frame on either the front or rear end or both ends of the pallet deck. The rear end frame can be pivotably connected to either side frame 1 or 2 and when the load pallet is nested, the rear end frame can be left in position. The front end frame can also be pivotably connected to either side frame 1 or 2 but, however, when the load pallet is nested, the front end frame must be pivoted outward and inward to be folded against the outer side of the side frame. If desired, a horizontal top or lid frame can be provided across the top between the side frames 1 and 2.

In addition, the load pallet can also be provided with two or more horizontal stacked pallet decks similar to pallet deck 4. The additional pallet decks are preferably pivotably connected to the side frames 1 and 2. Thus, a lower deck can be pivotably connected to side frame 1, whereby for nesting purposes, the lower deck can be folded up along the inside frame 1. Similarly, an upper deck can be pivotably connected to side frame 2, whereby for nesting purposes, the upper deck can be folded down along the inside of frame 2.

Figure 7:
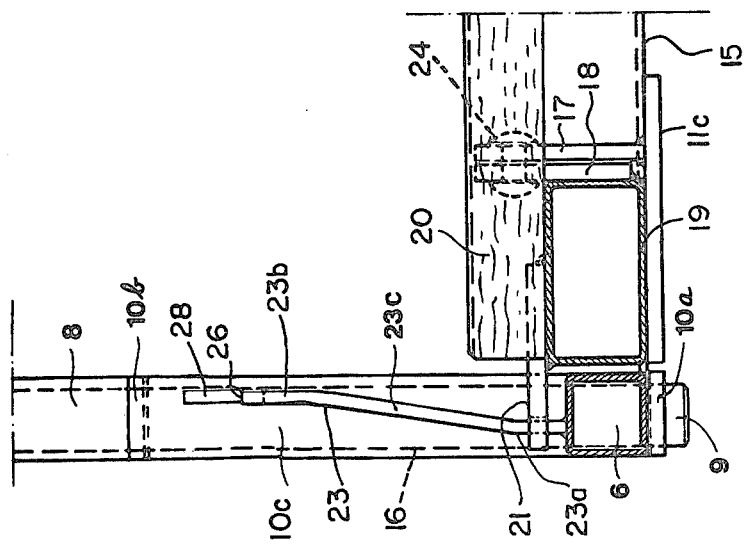
FIG. 7 is a view taken along line VII—VII of FIG. 6, partly in section.

The pallet deck 4 is pivotably connected to the lower connecting means 3 by joining vertical eyelet members 18 with vertical eyelet members 17 by means of rivet or pivot pins 24 disposed through eyelets 25 and 27, respectively as shown in FIGS. 3, 5 and 7. In order to make it possible to secure or lock the pallet deck in its vertical position, the eyelet 25 of eyelet member 18 is oval in shape (FIG. 6) in the plane of the pallet deck, whereby the rearward edge portion of the eyelet forms a pivot edge for the pallet deck.

With the pallet deck capable of being pivotable, it is desirable to maintain the deck securely in its horizontal position during operational use. The deck is provided with downwardly extending vertical pins 14 which can engage holes 13 of support plate 12 in the horizontal operational position. Thus, plate 12 supports the deck in the horizontal position and also provides means to secure the deck. Support plate 12 is horizontally, fixedly secured inwardly at the front lower end of each side frame. In order to provide a safe and suitable guide for pins 14, the support plate can be provided with guide tubes (not shown) on the underside thereof. Preferably, the pin 14 can be champhered or bevelled at its end and the hole 13 or guide tube correspondingly champhered or bevelled, whereby pin 14 can be guided upon entering hole 13. Preferably the inner diameter of the guide tube can be slightly larger than the diameter of the pin with the guide tubes angled obliquely slightly towards each other. Thereby, the pins can engage the guide tubes with a frictional fit, providing a relatively tight connection between the pallet deck in the folded down position and the side frames.

An essential aspect of this invention is the provision that the side frames can be automatically and positively guided in their pivotal movements both outwardly and inwardly by the manual movement of the pallet deck upwardly to a vertical locked position and downwardly to a horizontal operating position, respectively. The means for accomplishing this automatic movement provided by this invention comprise guide means 23 mounted on each side frame and guide follower means 21 mounted on each side of the deck, whereby the two means are in sliding engagement.

Figure 6:
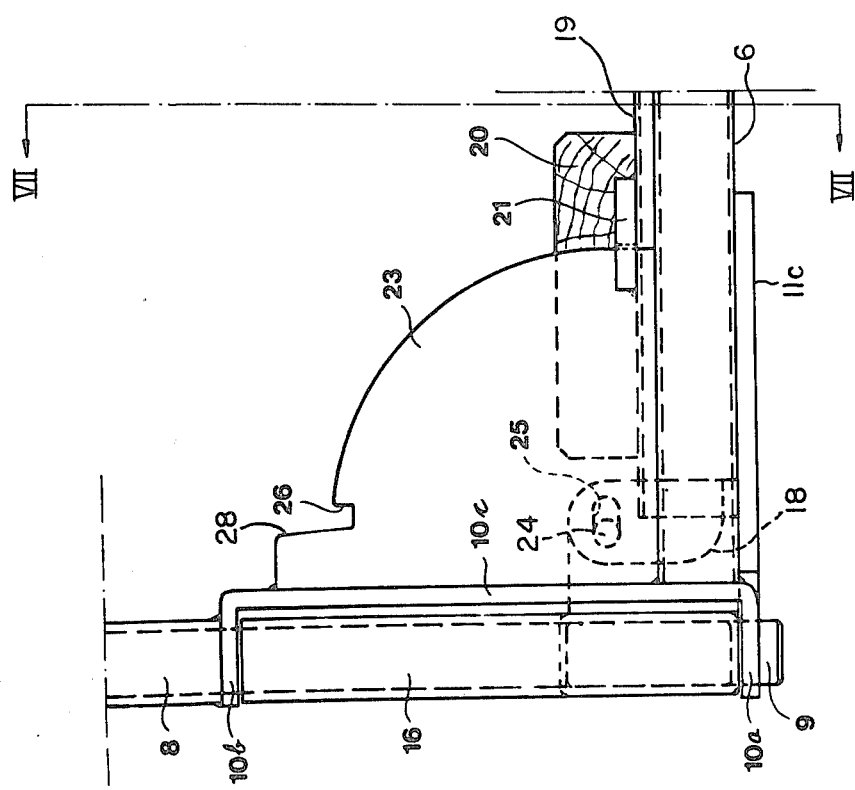
FIG. 6 is an enlarged, fragmentary, side view of hinge means and guide plate means whereby the automatic inward and outward movement of the vertical side frames is effected.

Guide means 23 is a spiral circular cam having cam surface 23c (FIGS. 6 and 7), the center line of which is coaxial with the pivotal axis of the pallet deck. Guide means 23 is secured, as by welding, to section 10c of hinge ring 10 and horizontal bar member 6, as shown in FIGS. 6 and 7, with spiral portion 23a disposed farther from the deck than spiral portion 23b, whereby the spiral cam surface 23c spirals inwardly towards the deck. Guide means 23 also comprises a slot 26 at the end of the cam surface and a stop shoulder 28. The inward inclination of the spiral cam provides the means for automatically pivoting the side frames 1 and 2 inwardly and outwardly and depending upon the inclination of the spiral cam of the guide plate 23, the side frames can be pivoted to a greater or lesser degree. By changing the form or direction of the spiral cam surface, special movements can be provided to the side frames for various purposes.

Guide follower means 21 comprises an arm member with a guide slot 22 adapted to engage and slide along the cam surface 23c of guide means 23. The arm member is rigidly secured to longitudinal bar member 19, planar to and external of the deck, and adjacent to the pivotal axis of the deck. Slot 22 is disposed towards the pivotal axis of the deck. As previously set forth, the center line of the guide means 23 or the spiral cam is coaxial with the pivotal axis of the pallet deck on horizontal bar member 15. The radius of the spiral cam surface is substantially the same and corresponds with the distance between the pivotal axis of the deck and the inner edge of slot 22.

The slot 26 at the end of cam surface 23c is of substantially the same width as the width of cam follower 21. When the pallet deck is folded up to its vertical position, it can be lowered so that slot 22 engages slot 26 to thereby lock the deck in the vertical position. The lowering of the deck in its vertical position is made possible by eyelet 25 having an oval shape as seen in FIG. 6. With the pallet deck in the lowered position with slots 22 and 26 engaged, the deck is locked against pivotal movement in any direction. Upon lifting of the deck to disengage slots 22 and 26, the deck can easily be folded down to its horizontal operating position.

With the device as described above, the invention provides the automatic and positive outward and inward pivotal movement of the side frames 1 and 2 with manual pivotal movement of the deck up and down. Thus, from an operating position wherein the deck is in a horizontal position and the side frames substantially parallel, the manual lifting of the deck causes the slot 22 of the guide follower to move along the spiral cam surface 23c of the guide plate 23 until it reaches slot 26 whereupon slot 22 drops into slot 26 and is automatically locked therein with guide follower 21 resting against shoulder 28.

Figure 4:
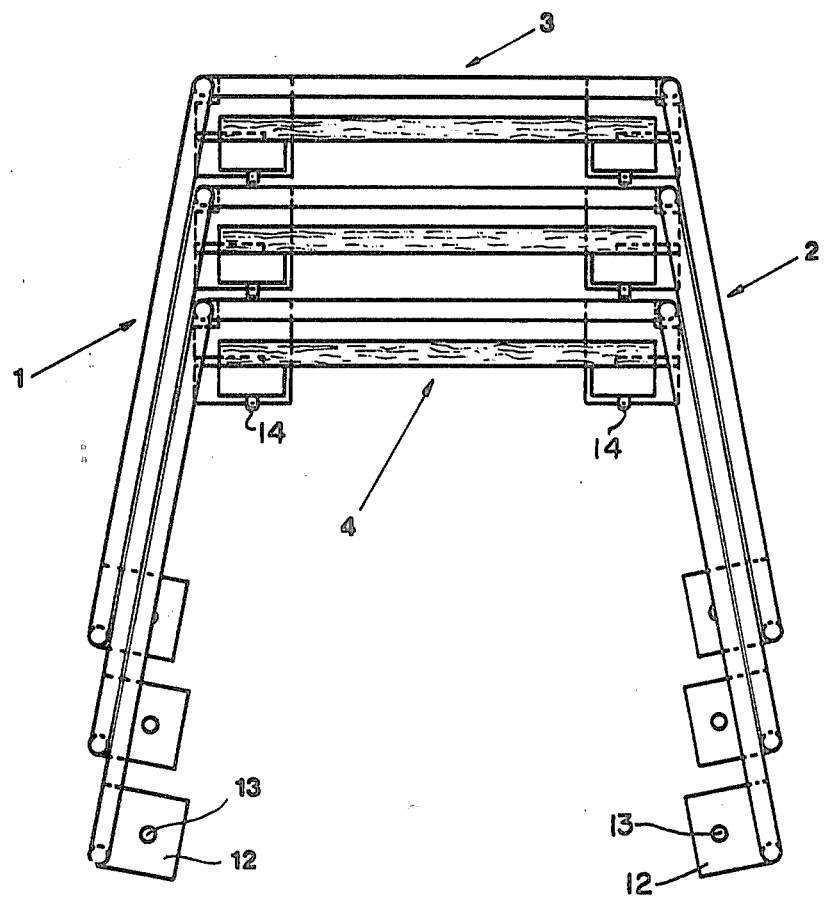
FIG. 4 is a top view of three nested load pallets with their pallet decks folded up to a vertical locked position and the side frames folded out to permit nesting.

Simultaneously with movement of the slot 22 along cam surface 23c, the side frames 1 and 2 are automatically pivoted outwardly to a position as shown in FIG. 4. In this outward position of the side frames and the folded-up locked position of the deck, a number of load pallets can be nested together as shown in FIG. 4. In order to make it possible to fully nest the load pallets into each other, the lower horizontal bar member 6 of side frames 1 and 2 must be disposed at a higher horizontal position than support plates 12, and as is shown in FIG. 5, an embodiment is shown for providing different levels for the bar member 6 and support plate 12. Therein, bar 6 is angularly displaced downwardly at the forward end 6a, at which the support plate is secured. In this manner the plates 12 and bar members 6 can be also nested together. Alternatively, a spacer can be provided between the support plate 12 and bar member 6 to accomplish the same result.

When it is desired to use the load pallets, they can be moved from their nested position, and a sole operator can place a pallet in operating position by merely slightly lifting the pallet deck, whereby the deck is moved down or permitted to move down by gravity while the guide follower 21 moves against cam surface 23c. Simultaneous with the downward movement, the side frames 1 and 2 are automatically pivoted inwardly to their operating substantially parallel position. The downward movement of the deck continues until the pins 14 on the bottom of the deck engage the holes 13 of support plates 12, whereupon the deck is also secured in an operating position.

The above described specific embodiment is merely illustrative of the invention and that various modifications are contemplated within the scope of the appended claims. It will be apparent to one skilled in the art that the guide plate means 23 and guide follower means 21 can be devised in various other ways. Thus, the automatic movement of the side frames 1 and 2 can also be accomplished by providing screw means on the pallet deck and the side frames provided with corresponding nut means having large inclination, or that the screw means be provided on the pallet deck rather than on the side frames whereby corresponding means on the side frames are guide means extending parallel with the side frames. Because, the torque increases when the pallet deck is folded up, it is apparent to one skilled in the art that the spiral cam can be formed with a large inclination in the portion furthest disposed from the pivot point and thereafter providing a succesively decreased inclination, or in any other suitable manner.

What is claimed is:

1. A nestable load pallet comprising horizontal connecting means, each end of said connecting means comprising vertical side frame means pivotably connected to said connecting means about a vertical axis with said side frame means at each end disposed in an opposed operating position, pallet deck means pivotably connected to said connecting means about a horizontal axis and disposed between said side frame means in a horizontal operating load supporting position, guide means and guide follower means interconnected with said side frame means and said pallet deck means for providing automatic coaction between said pallet deck and said side frame means when said pallet deck is pivoted about said horizontal axis, whereby when said pallet deck means is pivoted from said horizontal operating position to a vertical nesting position said side frame means are automatically pivoted outwardly from said opposed operating position to a diverged nesting position and said load pallet is nestable with other load pallets, and whereby when said pallet deck is pivoted from said vertical nesting position to said horizontal operating position said side frame means are automatically pivoted inwardly from said diverged nesting position to said opposed operating position.

2. The nestable load pallet of claim 1 wherein said connecting means comprise longitudinal bar means containing pivot means at each end, said side frame means comprise a lower vertical side edge containing pivot means, and said frame means are pivotably connected to said connecting means by said respective pivot means.

3. The nestable load pallet of claim 2 wherein said pivot means comprise hinge and pin means.

4. The nestable load pallet of claim 1 wherein said side frame means comprises an inverted U-shaped frame having a lower horizontal bar member and internal lattice structure, the inner branch of said U-shaped member comprising a vertical retractable pivot pin disposed within a vertical hinge ring, and said horizontal connecting means comprises longitudinal bar means containing vertical tubular hinge means at each end.

5. The nestable load pallet of claim 4 wherein said bar means is disposed no higher than the surface of said pallet deck means and said vertical tubular hinge means extend above the surface of said pallet deck means.

6. The nestable load pallet of claim 1 wherein said horizontal connecting means comprises longitudinal bar means, said longitudinal bar means and said pallet deck means both comprising pivot means connected together to provide a horizontal pivot axis of said pallet deck.

7. The nestable load pallet of claim 6 wherein said pivot means comprise eyelet members including eyelets disposed vertically on said bar member and said deck means comprise second eyelet member including eyelets, which respective eyelet members are connected together with pivot pin means.

8. The nestable load pallet of claim 1 wherein horizontal support plate means with hole means are disposed on a lower portion of said side frame means opposite from said horizontal connecting means, said pallet deck comprising vertical guide pin means on the bottom side opposite from said horizontal connecting means, whereby said vertical pin means are engaged in said support plate hole means to support said pallet deck when said pallet deck is in said horizontal load supporting position.

9. The nestable load pallet of claim 8 wherein said support plate hole means comprise guide tube means which are angularly displaced with respect to said vertical guide pin means to provide a frictional engagement therebetween.

10. The nestable load pallet of claim 1 wherein said guide means comprise spiral circular cam means disposed on said side frame means coaxial with said horizontal axis of said pallet deck means and sprialling inwardly towards said pallet deck means, said guide follower means comprise arm member means disposed on said pallet deck means containing guide slot means adapted to engage and slide along said cam means.

11. The nestable load pallet of claim 10 wherein vertical lock slot means are disposed on said cam means, said pallet deck comprises ovate pivot means pivotably engaging said connecting means, whereby when said pallet deck is in a vertical position said guide slot means will drop into and engage said lock slot means to thereby lock said pallet deck in a vertical nesting position.

12. The nestable load pallet of claim 10 wherein said spiral circular cam means are disposed vertically within said side frame means in a lower corner adjacent said vertical axis, said arm member means disposed coplanar with the surface of said pallet deck.

13. The nestable load pallet of claim 1 wherein said connecting means comprises fixed rollers and said side frame means comprise caster roller means oppostie said vertical axis.

14. The nestable load pallet of claim 8 wherein said lower portion of said side frame means comprises a horizontal bar member which comprises a downwardly displaced horizontal section at its end opposite said vertical axis.

* * * * *